(12) United States Patent
Brenner et al.

(10) Patent No.: US 11,349,365 B2
(45) Date of Patent: May 31, 2022

(54) STATOR SEGMENT

(71) Applicant: Siemens Aktiengesellschaft, Munich (DE)

(72) Inventors: Robin Brenner, Kirchham (DE); Artur Deutsch, Bad Griesbach i. Rottal (DE); Norbert Schönbauer, Bad Füssing (DE); Michael Weger, Kösslam (DE)

(73) Assignee: FLENDER GMBH, Bocholt (DE)

( * ) Notice: Subject to any disclaimer, the term of this patent is extended or adjusted under 35 U.S.C. 154(b) by 23 days.

(21) Appl. No.: 16/981,620

(22) PCT Filed: Feb. 7, 2019

(86) PCT No.: PCT/EP2019/052964
§ 371 (c)(1),
(2) Date: Sep. 16, 2020

(87) PCT Pub. No.: WO2019/018522
PCT Pub. Date: Oct. 3, 2019

(65) Prior Publication Data
US 2021/0028664 A1 Jan. 28, 2021

(30) Foreign Application Priority Data
Mar. 27, 2018 (EP) .................... 18164127

(51) Int. Cl.
*H02K 3/48* (2006.01)
*F03D 9/25* (2016.01)
*H02K 3/24* (2006.01)
*H02K 7/18* (2006.01)
*H02K 9/04* (2006.01)

(52) U.S. Cl.
CPC ................. *H02K 3/48* (2013.01); *F03D 9/25* (2016.05); *H02K 3/24* (2013.01); *H02K 7/1838* (2013.01); *H02K 9/04* (2013.01)

(58) Field of Classification Search
CPC .......... H02K 3/48; H02K 3/24; H02K 7/1838; H02K 9/04; F03D 9/25
USPC ...................................... 290/44, 55
See application file for complete search history.

(56) References Cited

U.S. PATENT DOCUMENTS

| 4,330,726 A | 5/1982 | Albright et al. |
| 2009/0091210 A1 | 4/2009 | Bade et al. |

FOREIGN PATENT DOCUMENTS

| CN | 1199950 A | 11/1998 |
| DE | 10 2005 029 895 A1 | 1/2007 |
| EP | 0 718 955 A2 | 6/1996 |

(Continued)

OTHER PUBLICATIONS

PCT International Search Report and Written Opinion of International Searching Authority dated Apr. 17, 2019 corresponding to PCT International Application No. PCT/EP2019/052964 filed Feb. 7, 2019.

*Primary Examiner* — Charles Reid, Jr.
(74) *Attorney, Agent, or Firm* — Henry M. Feiereisen LLC

(57) ABSTRACT

A stator segment of a stator of a dynamoelectric machine includes slotted laminations arranged axially one behind the other, such that substantially axially extending slots are formed. Coils are arranged in the slots, wherein one coil side or two coil sides of different coils are arranged in a slot. The laminations have at least one open slot on their outer boundary sides parallel to the slot. The coil sides are fixed in the open slots by an amagnetic fastener on the stator segment.

5 Claims, 4 Drawing Sheets

(56) References Cited

FOREIGN PATENT DOCUMENTS

| | | |
|---|---|---|
| EP | 2975729 A1 | 1/2016 |
| JP | S6370260 U | 5/1988 |

STATOR SEGMENT

CROSS-REFERENCES TO RELATED APPLICATIONS

This application is the U.S. National Stage of International Application No. PCT/EP2019/052964, filed Feb. 7, 2019, which designated the United States and has been published as International Publication No, WO 2019/185222 A1 and which claims the priority of European Patent Application, Serial No. 18164127.5, filed Mar. 27, 2018, pursuant to 35 U.S.C. 119(a)-(d).

BACKGROUND OF THE INVENTION

The invention relates to a stator segment, a stator and a generator, in particular a wind turbine.

DE 10 2005 029 895 A1 discloses a direct drive for large drives, which is assembled from a number of segments which have a sealed-off winding arrangement per segment.

EP 0 718 955 A2 discloses a stator of a multi-pole, multi-phase electric machine, wherein the stator is subdivided into a number of segments and a multiphase winding is located on each segment.

With segmented electric machines, in particular motors or generators in a higher power range above 1 MW, there is the option of dividing the iron packet of the stator so that half slots are present on the boundary sides parallel to the slot. A continuous slot and thus a winding is only produced by assembling the individual segments. This is implemented for instance with large toothed coil windings. The problem here is fixing the outer-lying coil limbs into the half slots in particular during the manufacturing process and assembly process, in order to fix the coil limb to its position during and after impregnation.

On this basis the object underlying the invention is to provide toothed coils, in the case of correspondingly configured stator segments, which can be fixed in a positionally accurate manner during the manufacturing and assembly process.

SUMMARY OF THE INVENTION

The set object is achieved by a stator segment of a stator of a dynamoelectric machine with
- slotted laminations arranged axially one behind the other, such that substantially axially extending slots are formed,
- coils arranged in the slots, wherein one coil side or two coil sides of different coils are arranged in a slot.
- wherein the laminations have at least one open slot on their outer boundary sides parallel to the slot,
- wherein the coil sides are fixed in the open slots by amagnetic fastening means on the stator segment.

The set object is also achieved by a stator with inventive stator segments, wherein the open slots which face one another are fastened to one another by way of fastening means on the yoke rear of the stator segments.

The solution to the set object is also achieved by a dynamoelectric machine, in particular a generator of a wind power plant, with an inventive stator, wherein a cooling system, in particular a fan, is provided, by means of which cooling air can be conveyed into the available gap between the partial laminated cores.

In accordance with the invention, the outer-lying coil limb is fixed to the end of the stator segment by means of nonmagnetic fastening means. By means of this non-magnetic fastening means, heating-up as a result of eddy currents during operation of the dynamoelectric machine, in other words e.g. the wind power generator, is avoided. Furthermore, by fixing the outer-lying coil limb, in particular during the manufacturing process, here above all the impregnation process, but also during the assembly process, it is ensured that the coil limb is not removed from the tooth forming an open slot and thus does not negatively affect the assembly or further manufacturing steps.

In one embodiment, the amagnetic fastening means are realized in particular by means of non-magnetic cable ties, strings or straps, which, during the manufacturing process, ensures a rapid and unproblematic fixing by means of cost-effective standard parts. Moreover, it is advantageous for these nonmagnetic fastening means, in particular cable ties, to ensure a consistently strong fixing of the coil limbs to the outer-lying teeth, which in particular is also advantageous for longer storage times of such segments.

Spacers are provided between partial laminated cores of the laminated core of the stator segment, which on the one hand distance the partial laminated cores from one another, form radial cooling channels within the laminated core of the stator segment and thus the stator and also serve as a holding device for the amagnetic fastening means for fixing the coil limb to the slot side wall.

In their radial extent the spacers are at most as high as the yoke rear and the radial tooth height. In the normal case, the spacers will project into the region of the yoke rear and also not assume the maximum tooth height.

BRIEF DESCRIPTION OF THE DRAWING

The invention and further advantageous embodiments of the invention are explained in more detail on the basis of exemplary embodiments shown in principle, in which.

DETAILED DESCRIPTION OF PREFERRED EMBODIMENTS

Figure 1:
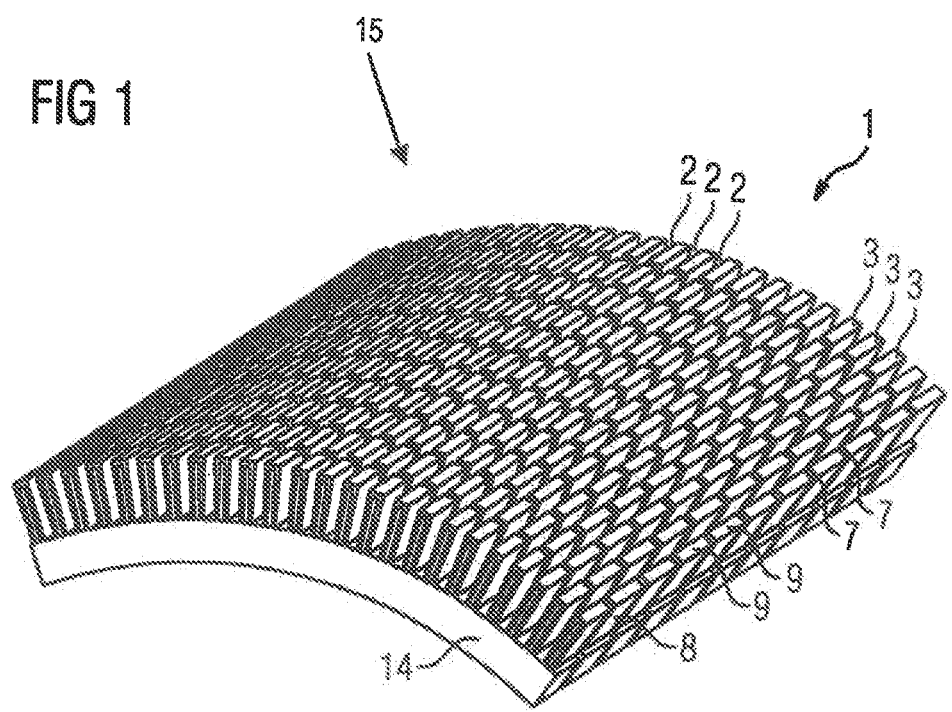
FIG. 1 shows a stator segment.

FIG. 1 shows a stator segment 1 of a dynamoelectric machine 11, in particular a generator with an external rotor, from which it is evident that the slots 2 of this stator segment 1 project radially outward in the manner of a spike and the stator segment 1 is embodied to be convex.

In this case the stator segment 1 is assembled in the axial direction from individual partial laminated cores 9, which are distanced from one another by means of spacers 5. Each partial laminated core 9 has a predefined number of laminations 8. In the individual case of the stator segment 1 or of an assembled stator 15 in a wind power plant 12 of a generator, this packaging of the stator segment 1 facilitates a radial cooling of the stator 15.

Preformed coils, in particular toothed coils 4, each of which comprises a tooth 3 or a number of teeth, are inserted into the slots 2 of the stator segment 1.

Figure 2:
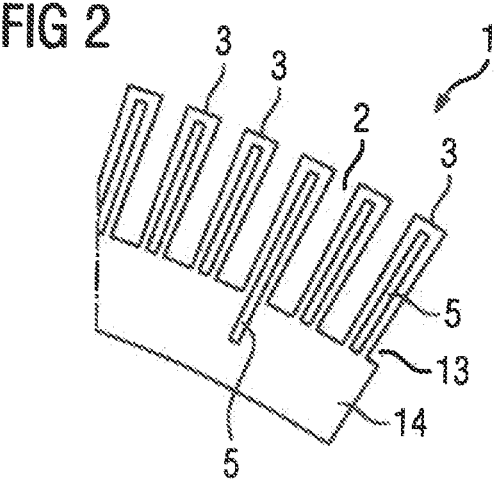
FIG. 2 shows a partial cutout of a stator segment.

FIG. 2 shows a detailed view of a periphery of a stator segment 1 with its teeth 3 pointing radially outward, the slots 2 and the indicated spacers 5 between the partial laminated cores 9. In this representation, the spacers 5 are configured essentially narrower in terms of width than the width of a tooth 3. This embodiment, viewed in the radial direction, forms cooling channels of the stator segment 1 with a comparatively large cross-section. The spacer 5 extends in a radial direction as far as the yoke rear 14 or for mechanical reasons until it enters the yoke rear 14 of the stator segment 1.

In their radial extent together the spacers 6 are at most just as high as the yoke rear 14 and the radial tooth height. In the normal case, the spacers 5 will project into the region of the yoke rear 14 and also not assume the maximum tooth height, such as is shown by way of example on a tooth 3 in FIG. 2.

Only one part of a slot 2, which is referred to as the open slot 13, is therefore located on the outer edge of the stator segment 1, into which slot 2 a coil limb 10 of a toothed coil 4 or another preformed coil is positioned. A slot 2 is composed of slot side walls and a slot base. A slot which only has one slot side wall and at least one part of the slot base is accordingly referred to as an open slot 13.

The slots 2, 13 are essentially parallel here to an axis 16 of a stator 15.

Figure 3:
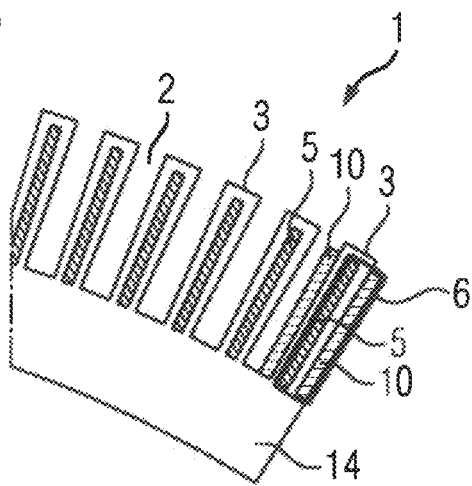
FIG. 3 shows a partial cutout of a stator segment with toothed coil.

Provision is made for an amagnetic cable tie 6 in order now to obtain a positioning accuracy and to fix this coil limb 10 of a preformed coil or toothed coil 4, as shown in FIG. 3, to the spacers 5, which extend in the gap 7, in other words the axial distance between the partial laminated cores 9. The amagnetic cable tie 6 is placed around the outer-lying coil limb 10 of a toothed coil 4 located in the open slot 13. The outer-lying coil limb 10 is therefore fixed to the spacer 5 by means of the amagnetic cable tie 6, the spacer 5 in turn being wedged between the partial laminated cores 9 and fixed there. This also facilitates the impregnation during the manufacturing process, since a "moveable outer-lying coil limb 10" is avoided.

Figure 4:
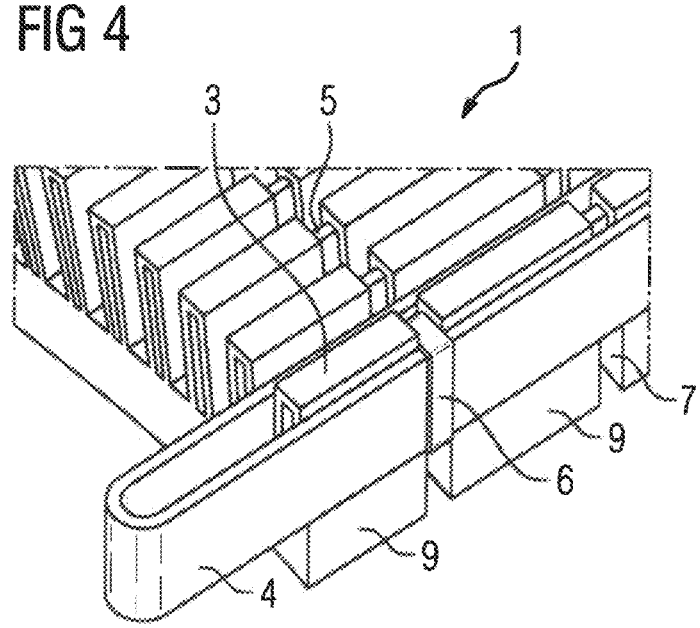
FIG. 4 shows a perspective representation of a partial segment.

The positioning of the amagnetic cable tie 6 in a radial gap 7 between two partial laminated cores on the spacer 5 is shown in a perspective representation of this external region according to FIG. 4. The outer-lying coil limb 10 is therefore firmly fixed to the outer-lying tooth. One side of this tooth forms the slot side wall of the open slot 13. The amagnetic cable tie 6 therefore pulls the outer-lying coil limb 10 to the slot side wall of the open slot 13.

On account of at least one cutout in the spacer 5 and/or in the coil 4 in the axial region of this spacer 5, the amagnetic cable tie 6 can also encompass only sections of the spacer 5 and the coil 4, without negatively affecting the intended fixing of the coil 4 to the tooth. Here the cable tie 6 can be threaded through these cutouts. This reduces the scope for entangling so that shorter cable ties 6 can also be used.

With the described stator segments 1 an amagnetic cable tie 6 of this type is provided on one or more spacers 5 for fixing the coil limb 10. Viewed on the axial length of a stator segment 1 are located for instance the cable ties 6 on just one or on each spacer 5 or every second spacer 5.

Figure 5:
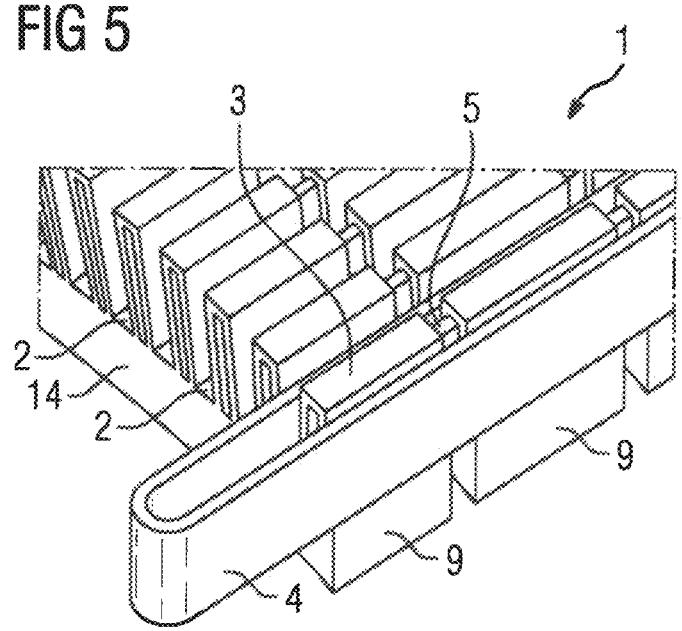
FIG. 5 shows a perspective representation of a stator segment.

In another representation of this arrangement according to FIG. 4, FIG. 5 shows how the coil 4 is positioned on the last tooth of the stator segment 1. The spacer 5 between the partial laminated cores 9 is not yet provided here with an amagnetic cable tie 6. Therefore the outer-lying coil limb 10 would, in the further manufacturing process or even during assembly of the stator segments 1, move toward a stator 15, possibly away from the tooth 3.

Figure 6:
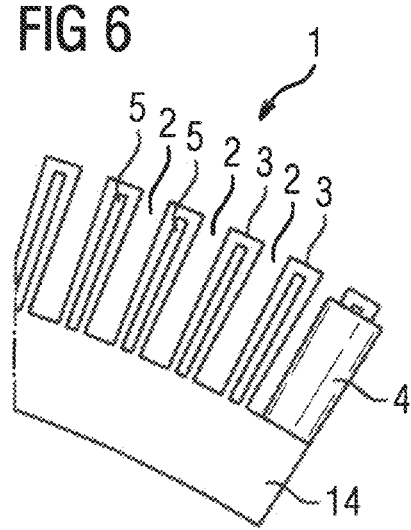
FIG. 6 shows a partial cutout of a stator segment with toothed coil.

FIG. 6 shows a cross-section of the afore-cited representation of the arrangement of the coil 4 on the last, in other words outer tooth 3, wherein the winding system of this stator segment 1 can be assembled in that a toothed coil 4 is provided around each tooth 3. This means that different coil sides of different coils 4 are available in each slot 2.

Each coil limb located in an open slot 13 is fixed by one or more preferably axially distributed cable ties 6 on the outer tooth or on the slot side wall of the open slot 13 in the region of the spacer 5.

Figure 7:
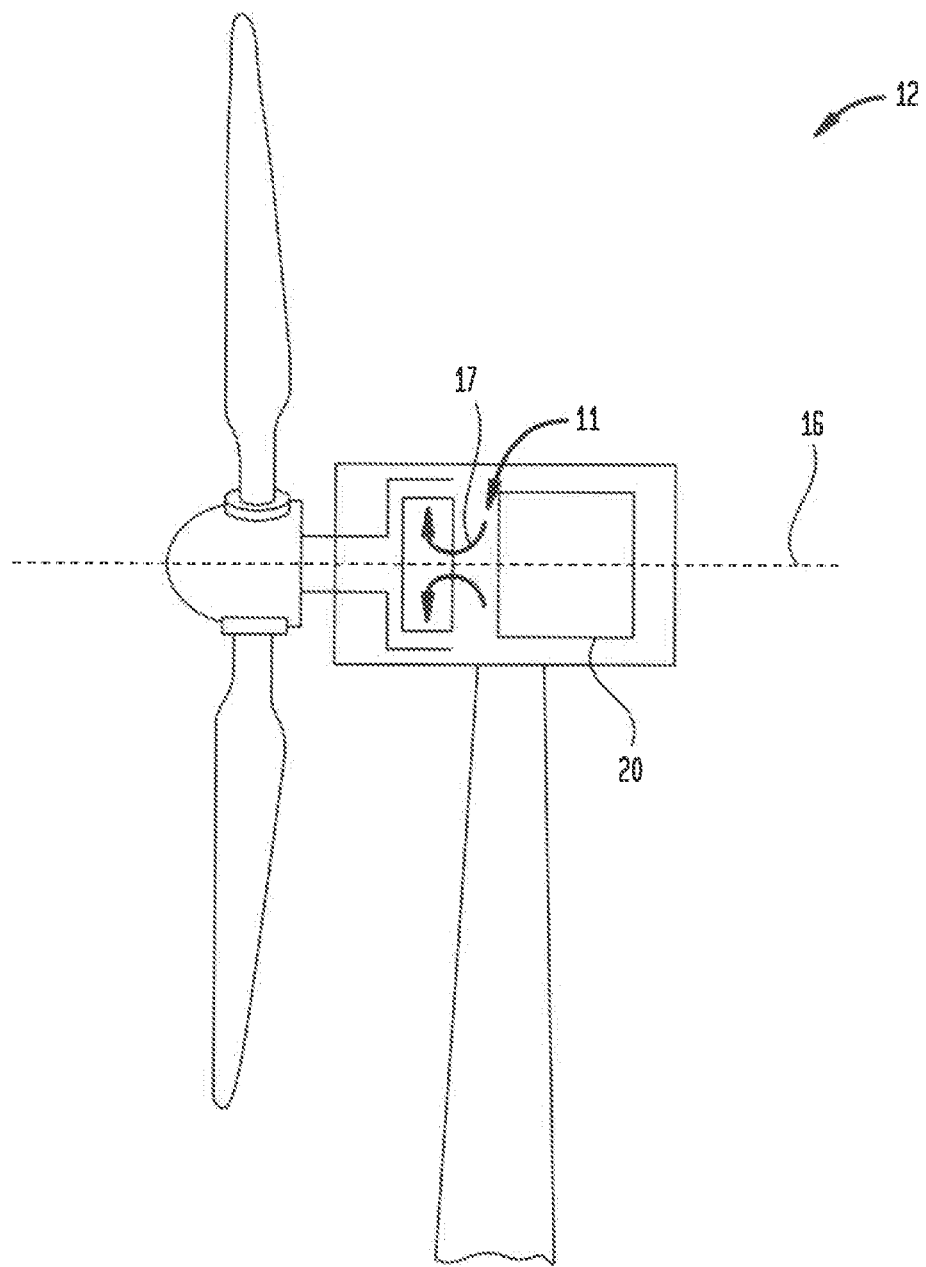
FIG. 7 shows a wind power plant shown in principle.

An arrangement of this type of stator segments 1 is preferred in the case of stators 15 which are provided for large powers and/or direct drives, in particular in wind power plants 12 according to FIG. 7 or tube mills. A rotor rotates here about an axis 16, wherein the slots 2 of the stator segment 1 and the stator 15 are essentially aligned axially in parallel.

Here a fan 20 can generate a cooling flow 17, which cools at least the generator and/or converter components, in particular the stator 15 by way of the radial cooling channels in the stator segment 1 generated by the spacer 5.

The invention claimed is:

1. A stator segment of a stator of a dynamoelectric machine, said stator segment comprising:
   slotted laminations arranged in spaced-apart relation axially behind one another to thereby form substantially axially extending first slots, said laminations having each an outer boundary side formed to exhibit a second slot which is open in parallel relation to the first slots;
   coils arranged in the first and second slots such that two coil sides of different cons are arranged in a corresponding one of the first slots and one coil side of a corresponding one of the coils is arranged in the second slot;
   spacers provided in an axial direction downstream of a predeterminable number of laminations so as to establish two or more partial laminated cores of the stator segment, when viewed in the axial direction; and
   amagnetic fasteners in the form of cable ties to fix the coil sides of the coils in the second slots on the stator segment, said amagnetic cable ties being arranged in a region of the axially spaced-apart laminations and having each at least one section guided about a corresponding one of the spacers.

2. A stator, comprising:
   stator segments, each said stator segment including slotted laminations arranged in spaced-apart relation axially behind one another to thereby form substantially axially extending first slots, said laminations having each an outer boundary side formed to exhibit a second slot which is open in parallel relation to the first slots, coils arranged in the first and second slots such that two coil sides of different coils are arranged in a corresponding one of the first slots and one coil side of a corresponding one of the coils is arranged in the second slot, spacers provided in an axial direction downstream of a predeterminable number of laminations so as to establish two or more partial laminated cores of the stator segment, when viewed in the axial direction, and amagnetic fasteners in the form of cable ties to fix the coil sides of the coils in the second slots on the stator segment, said amagnetic cable ties being arranged in a region of the axially spaced-apart laminations and having each at least one section guided about a corresponding one of the spacers,
   wherein the open second slots of two stator segments which face one another are only provided with a coil limb of one stator segment or two coil limbs of different but adjacent stator segments.

3. A dynamoelectric machine, comprising:

a stator including stator segments, each said stator segment including slotted laminations arranged in spaced-apart relation axially behind one another to thereby form substantially axially extending first slots, said laminations having each an outer boundary side formed to exhibit a second slot which is open in parallel relation to the first slots, coils arranged in the first and second slots such that two coil sides of different coils are arranged in a corresponding one of the first slots and one coil side of a corresponding one of the coils is arranged in the second slot, spacers provided in an axial direction downstream of a predeterminable number of laminations so as to establish two or more partial laminated cores of the stator segment, when viewed in the axial direction, and amagnetic fasteners in the form of cable ties to fix the coil sides of the coils in the second slots on the stator segment, said amagnetic cable ties being arranged in a region of the axially spaced-apart laminations and having each at least one section guided about a corresponding one of the spacers, wherein the open second slots of two stator segments which face one another are only provided with a coil limb of one stator segment or two coil limbs of different but adjacent stator segments; and a cooling system configured to convey cooling air into a gap between the partial laminated cores.

4. The dynamoelectric machine of claim 3, constructed in the form of a generator of a wind power plant.

5. The dynamoelectric machine of claim 3, wherein the cooling system includes a fan.

\* \* \* \* \*